United States Patent [19]
de Lassat de Pressigny et al.

[11] Patent Number: 5,562,753
[45] Date of Patent: Oct. 8, 1996

[54] METHOD AND INSTALLATION FOR PRODUCING MOLTEN STEEL FROM FERROUS MATERIALS RICH IN CARBONACEOUS MATERIALS

[75] Inventors: Yann de Lassat de Pressigny; Henri Gaye; Jean-Luc Roth; Yves Zbaczyniak, all of Metz, France

[73] Assignees: SOLLAC (Societe Anonyme), Puteaux; UNIMETAL, Rombas, both of France

[21] Appl. No.: 249,211

[22] Filed: May 26, 1994

[30] Foreign Application Priority Data

May 27, 1993 [FR] France .................... 93 06622

[51] Int. Cl.$^6$ ............................................. C21C 5/52
[52] U.S. Cl. ............... 75/10.63; 75/10.41; 75/10.45; 75/583; 373/78
[58] Field of Search .............. 75/10.63, 10.41, 75/10.45, 583; 373/78

[56] References Cited

U.S. PATENT DOCUMENTS 2,978,315  4/1961  Schenck ..................... 75/10.59
3,610,795  10/1969  Antoine ...................... 373/78
4,200,452  4/1980  Savov ........................ 75/10.41

FOREIGN PATENT DOCUMENTS 0199714  3/1990  European Pat. Off. .
3232139  4/1991  Germany .
2030179  2/1982  United Kingdom .

*Primary Examiner*—Peter D. Rosenberg
*Attorney, Agent, or Firm*—Sixbey, Friedman, Leedom & Ferguson

[57] ABSTRACT

Both a method and apparatus for producing molten steel are provided wherein ferrous materials rich in carbonaceous materials are fused in a first vessel of a single electric furnace having separate first and second vessels. The carbonized molten metal thus obtained is then pretreated in a separate pretreatment facility to remove contaminants and the pretreated molten metal is then decarburized in the second vessel of the electric furnace. The decarburization of the pretreated metal in the second vessel of the furnace avoids reintroducing contaminants into the steel by avoiding contact between the pretreated metal and the slag produced when the initial carbonaceous materials are fused. Preferably, the first and second vessels are two vessels of a single electric furnace having a single electric power source.

11 Claims, 1 Drawing Sheet

METHOD AND INSTALLATION FOR PRODUCING MOLTEN STEEL FROM FERROUS MATERIALS RICH IN CARBONACEOUS MATERIALS

BACKGROUND OF THE INVENTION

The invention relates to the production of steel in an electric furnace. In particular it relates to methods of producing steel wherein the raw materials are comprised partly or entirely of pre-reduced iron ore and not solely of scrap.

Research is currently underway to develop siderurgical methods which can substitute for blast furnaces. The methods developed by such research seek to eliminate certain disadvantages of blast furnaces, such as the lack of flexibility in operation, and the need to employ a coke works and a facility for agglomerating the iron ore. However, a novel method in order to be deemed satisfactory should retain the excellent energy efficiency of blast furnaces. The new methods being researched are often referred to as "reduction-fusion" or "smelting reduction" processes. One of these methods utilizes a combination of two reactors, the first of which starts with iron ore and produces a treated ore which is appreciably reduced to the metal state. This treated ore is charged to a second reactor where it is transformed either into a molten iron analogous to pig iron, or directly into raw steel. The gas circuits of the two reactors may be interconnected or completely independent.

A particular embodiment of such a method is described, e.g., in an article entitled "Reduction Of Fine Ore In A Circulating Fluid Bed As The Initial Stage In Smelting Reduction" [(in English)], in a March, 1991 issue of *Metallurgical Plant and Technology International*, on pages 28–32, and in French Patent App. No. 91–14467 assigned to the present applicant. The reduction reaction of the iron ore is accomplished by reacting a circulating fluidized bed formed by particles of semi-coke and ore undergoing reduction, fluidized by a reducing gas mixture of $CO$, $CO_2$, $H_2$, and $H_2O$. The reduction reaction takes place in a first zone of the reactor. The gas and entrained particles of semi-coke and ore undergoing reduction are then passed into a cyclone separator, where the gas is withdrawn from the reactor. The particles then descend into a gasifier unit where coal and oxygen are introduced separately or together to form CO and hydrogen to contribute to the further reduction of the ore. The solid and gaseous materials are then fed back to the first zone of the reactor. Periodically or continuously a portion of the solid material (comprising reduced ore and semi-coke) in this first zone is withdrawn. Fresh ore is introduced into the stream of materials between the cyclone and the gasifier. The gas withdrawn from the cyclone is treated to remove contaminants and reintroduced into the gasifier and at the bottom of the first zone of the reactor where it can again function as a fluidizing medium and reagent.

The solid materials removed from the reactor are then sent to the fusion reactor to contribute to the production of molten metal (pig-type iron, semi-pig-type iron, or steel, depending on carbon content). As previously mentioned, these materials are comprised essentially of a mixture of substantially-reduced iron ore (reduced to the extent of at least c. 75%) and semi-coke, accompanied by minor amounts of other nonferrous materials from impurities in the ore, and possible additives.

These materials, hereinafter referred to as "pre-reduced" materials for the sake of simplicity, are distinguished from pre-reduced ores produced by other types of facilities in that the materials produced by the subject method may have particularly high levels of carbon and sulfur. The carbon content is 4–7% or more (compared to the usual 1–3%), and the sulfur content is 0.06–0.1% (compared to the usual 0.01–0.02%). The high sulfur content is caused by the use of coal as a carbon source, instead of the natural gas used in other "fusion-reduction" methods. Consequently it is desirable to carry out a desulfurization operation on the molten iron prior to converting the iron to steel, if ultimately one wishes to produce grades of steel having very low residual sulfur content (e.g. a few thousandths of a percent). Achieving such a low sulfur content solely by desulfurization of molten steel would be difficult and onerous.

The fusion reactor for the solid materials may be a converter or a steelmaking electric furnace of classical construction. An electric furnace has the advantage of lower capital and operating cost compared to a converter if the capacity of the apparatus is on the order of 100 T molten metal or less. Furthermore, an electric furnace affords great flexibility in the choice of raw materials, because the pre-reduced material can be mixed in such a furnace with any desired quantity of scrap without giving rise to problems. The scrap input may be adjusted optimally depending on the respective costs of the materials being treated, and the tolerances for residual elements (such as copper, chromium, nickel, etc.) in the final metal, which residual elements are inevitably present in scrap but only minimally present in the pre-reduced material.

Unfortunately, a classical electric furnace, because of its shape, is poorly adapted for an operation of desulfurization of the molten iron, and in general for other pretreatment operations which customarily may be called for prior to the conversion of the iron to steel (e.g. desilicization and dephosphorization). Because these operations entail intensive mixing between the metal and the slag, it is preferable to transfer the molten iron to another reactor to perform such operations; e.g., a steelmaking ladle having a truncated cone shape, or a torpedo shaped ladle of the type commonly used for transporting molten iron. After the pretreatment, the molten iron is returned to the furnace to be decarburized there. However, it then risks being polluted by the remaining molten iron which has not been pre-treated, and by the residual slag in the furnace that is rich in sulfur and phosphorus which are inevitably present following fusion. This pollution risk is aggravated if the permanent presence of a "heel" is required for steady operation of the furnace. Finally, an electric furnace installation achieves only mediocre productivity because the furnace is idle during the pre-treatment.

SUMMARY OF THE INVENTION

An object of the present invention is to devise an inexpensive and productive method of producing steel from pre-reduced ore rich in carbon, enabling one to obtain a steel having a very low sulfur content and, if necessary or desirable, a very low phosphorus content.

This object is achieved by a method of producing molten steel wherein ferrous materials rich in carbonaceous materials are fused so as to obtain a carburized molten metal, and the molten metal is then decarburized in order to convert it to molten steel, which is characterized by the steps of fusing the ferrous materials in a first vessel of an electric furnace, pretreating the carburized molten metal thus obtained is in a separate pre-treatment facility, and finally decarburizing the molten metal in a second vessel of an electric furnace. Preferably, the pretreatment step includes a desulfurization operation of the carburized metal.

A second object of the invention is the provision of an installation for implementing the described method to produce molten steel. Preferably, the installation comprises first and second vessels that are two independent vessels of a single electric furnace having a single electric power means.

Broadly speaking, the invention encompasses a method and apparatus for obtaining molten steel that employs two distinct electric furnaces, or preferably a single electric furnace having two vessels and only a single electric power facility which powers the two vessels alternately in succession. The first vessel is dedicated to the fusion of ferriferous materials to form a pretreated molten metal rich in carbon which may also contain substantial amounts of sulfur. The second vessel is dedicated to the decarburization of the pretreated molten metal, possibly with an admixture of ferriferous materials which are low in sulfur. In addition to the two furnaces (or the double-vessel furnace) there is a facility for pretreating metal rich in carbon. Such carbon rich metal is transferred to the pretreatment facility after complete fusion in the first vessel. The treatment in the facility may include desulfurization. Following this, the molten metal is transferred to the second vessel to be decarburized.

The invention will be better understood by reading the following description with reference to FIG. 1.

DETAILED DESCRIPTION OF THE PREFERRED EMBODIMENT

Figure 1:
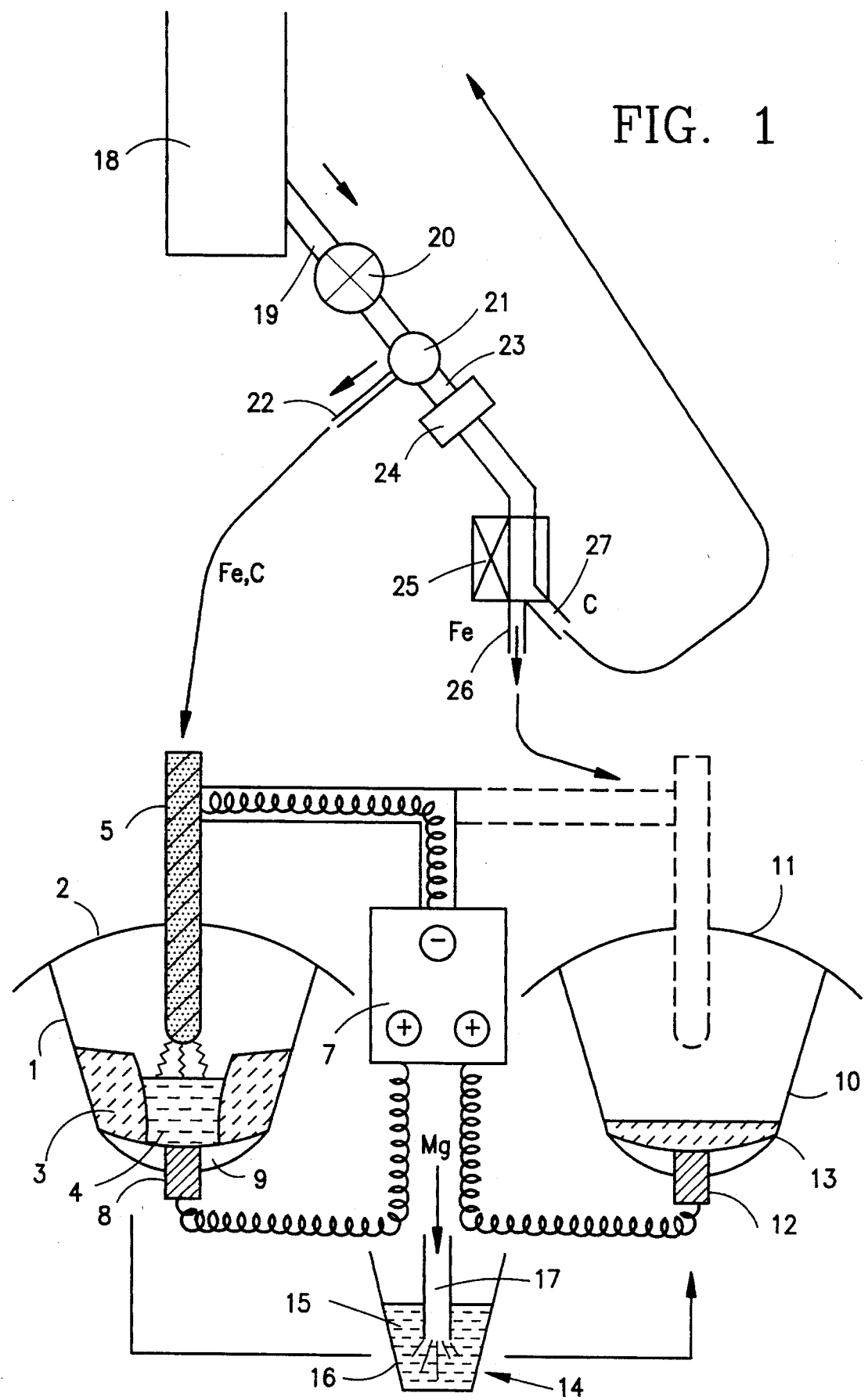
FIG. 1 schematically illustrates the reactors of the installation of the invention and their auxiliary units used to implement the inventive method.

With reference now to FIG. 1, the installation of the preferred embodiment of the invention comprises a double-vessel electric furnace of the mono-electrode DC type, although a multi-electrode DC or classical AC electric furnace may be used.

The furnace has a first vessel 1 covered by a roof 2, which vessel contains pre-reduced materials 3 which are highly carburized and which are undergoing fusion, and liquid iron 4 containing, e.g., 4–7% carbon, which iron results from this fusion. The fusion is brought about by an electric arc established between an electrode 5 associated with the roof 2 (called the "roof electrode") and held on a horizontal support beam 6, which electrode is connected to the negative terminal (in the example shown) of a DC generator 7, and the liquid iron 4, connected to a positive terminal (in the example shown) of the generator 7 by the intermediary of an electrode 8 having a metallic core and traversing the refractory bottom 9 of the vessel 1. This electrode is called the "bottom electrode" and is of a type which is per se known and described in Eur. Pats. 0,183,631 and 0,235,465.

The furnace also has a second vessel 10 identical to the first vessel 1 and also covered by a roof 11. Vessel 10 has its own bottom electrode 12 connected to a second positive terminal of the generator 7. However, vessel 10 can only be powered by the same roof electrode 5 and generator 7 as are used for the first vessel 1, which is indicated in the Figure by the dotted-line representation of the horizontal beam 6 and electrode 5 showing the electrode 5 inserted in the second vessel 10. Consequently, only one of the two vessels 1, 10 can be in operation at a given time the other is in an idle status. One may exploit the standby status by charging the standby vessel with the solid materials which are to be fused in its next utilization, as indicated by the pile of material 13 shown on the bottom of the second vessel 10.

A facility 14 for desulfufizing the molten iron 4 is disposed near the two vessels 1, 10. Liquid iron 15 which has been tapped or otherwise transferred from the first vessel 1 into a ladle 16 (or other suitable receptacle) is subjected in facility 14 to a desulfurization treatment wherein magnesium is injected by metallurgical blast means into the interior of the molten iron using a pneumatic lance 17 via a widely known prior art method. For the same purpose, one may also inject (in addition to magnesium) sodium carbonate, lime, calcium carbide, or a mixture of two or more of these. The high carbon content of the molten iron favors effective desulfurization. After the desulfurization, the molten pig-type iron 14 is transferred into the second vessel 10 for decarburization to convert it to molten steel.

FIG. 1 also schematically illustrates the auxiliary equipment for the fusion and treatment apparatus that was described previously. The auxiliary equipment functions to select the materials which are to be charged to one or the other of the vessels 1, 10. Structure 18 is the lower part of a prereduction reactor for iron ore, which reactor is of the same type as described in the previously-cited article and French patent application. Solid materials produced by the reactor are withdrawn from this lower part 18, intermittently or continuously, into a conduit 19. These materials comprise prereduced iron ore metallized to between 80–85 wt. % and mixed with carbonaceous materials comprising between 4–7 wt. %, or possibly more, of the mixture.

The withdrawal rate of the solid materials from the lower part 18 is controlled by a valve 20. When the solid materials leave the valve 20, they enter a diverting device 21 which directs them to one or the other of the conduits 22 and 23. In conduit 22 the materials are not subjected to any particular treatment, and thus they retain the weight proportions of prereduced material and carbon which they had when leaving the pre-reduction reactor 18. Conduit 22 then directs them to the first vessel 1, either directly or by way of a storage hopper (not shown). Thus these materials are destined to form part of the metal which will be subsequently transferred out. The fusion of these materials in the first vessel produces a molten iron having a high sulfur content (0.06–0.1%), because the carbon has been supplied by non-desulfurized coal. When the solid materials are diverted by device 21 into conduit 23, the materials are first cooled by a cooling device 24, such as a water jacket, mounted around the conduit 23. The water jacket 24 reduces the temperature of the ferrous materials (which is about 950° C. at the outlet of the prereduction chamber) to a temperature below the Curie point, which is about 770° C. In this way the ferrous particles in the solid materials are rendered subject to the action of a magnetic field. The solid materials then pass into a magnetic separation device 25 which separates and diverts the ferrous particles into a conduit 26. Conduit 26 feeds these ferrous particles, either directly or by the intermediary of a storage hopper (not shown), to the second vessel 10 intended for ferrous materials having a lower content of carbonaceous materials.

The lower carbon content of the materials in the second vessel 10 means that if any additional carbon is needed to supplement the charge of metal, such supplementary carbon addition can be minimized, and, in particular, sulfur addition can be minimized. In this way one avoids excessive countering of the effects of part of the beneficiated material withdrawn from the desulfurization process carried out on the molten iron 15 prior to the charging of said iron to the second vessel 10. The above-mentioned ferrous materials may be added to the second vessel 10 prior to the charging of the desulfurized molten iron, and it is possible to fuse these ferrous materials prior to said charging of said iron. It is even possible to add the ferrous materials during decarburization. Meanwhile, the materials leaving the magnetic separator 25 via conduit 27 are recycled to the prereduction unit 18. The operation of the apparatus may be completed by charging scrap into the vessels 1, 10 to supplement the charges therein, if desired, in cases where the limitations on the content of residual elements are not too stringent. By adjusting the respective proportions of pre-reduced material and scrap in the formation of metal to be cast, one may work a compromise between the metallurgical and economic factors, taking into account the costs of the pre-reduced material and of the various grades of scrap available on the market.

It is also possible to obtain molten steel directly from pre-reduced material that has been decarbonized in the magnetic separation device previously described. In such a case, a diverting device (not shown) must be provided in conduit 26 to direct prereduced material to the first vessel 1. However, the decarbonization of said prereduced material may be insufficient with regard to sulfur content, wherewith the remaining sulfur content may not be low enough, so that if the material is then passed to a specific desulfurization stage the resulting sulfur content will not be low enough for the lowest-sulfur grades of product. In any event, the more efficient course is to convert the prereduced material to a carburized metal rather than to a steel. Consequently, the conversion of a solid prereduced material to a substantially desulfurized molten steel turns out to be more favorable both metallurgically and economically if it includes an intermediate stage of a molten pig iron or, more generally, a molten metal more carburized than is normal for steel.

The use of two vessels 1, 10 in the furnace, and the use of the desulfurization apparatus 14, should be synchronized such that; (1) only one of the two vessels 1, 10 is operating in fusion status at a given time, since they operate from common electric power supply 5, 6, 7; (2) the electric power supply 5, 6, 7 is in use as often as possible; and (3) the interval of time between two tappings of steel from the second vessel 10 is as short as possible.

A non-limiting example of a preferred method of producing a steel by means of the aforementioned installation will now be described. The following Table gives a detailed chronology beginning with the first start-up of the operation of the installation after a stoppage. It is assumed that each vessel 1, 10 has a capacity of 100 T of molten metal, further that the power of the electrical power supply 7 is 70 MW, and that under these conditions it takes 26 min to fuse 100 T of the pre-reduced material. An additional 3 min is allowed for moving the roof electrode 5 from one vessel to the other. In the Table the periods during which the electrical facility is in use are underlined. For each vessel, idle time is utilized for maintenance operations such as a complete deslagging, or repairs to the refractory lining.

| Time (min) 1st vessel | Time (min) Desulfurization Apparatus | Time (min) 2nd Vessel |
|---|---|---|
| Startup phase: | | |
| 0–3 Charging of materials. | | |
| 3–29 Fusion of pig-type iron. | | |
| 29–32 Transfer to ladle. | | |
| 32–58 Charging of materials and fusion of pig-type iron. | 32–35 Transfer to ladle. | |
| | 35–37 Analysis of sample. | |
| | 37–47 Desulfurization. | |
| | 47–49 Analysis of sample. | |
| | 49–58 Removal of slag, followed by idle period. | 53–58 Charging of material. |
| First cycle: | | |
| 58–61 Moving of electrode. | 58–63 Idle. | 58–61 Moving of electrode. |
| 61–71 Idle. | 63–66 Transfer to ladle. | 61–66 Fusion of the material |
| | 66–71 Transfer to 2nd vessel. | 66–71 Charging of material. |
| 71–74 Transfer to ladle. | 71–74 Idle. | 78–86 Fusion and decarburization. |
| 74–85 Idle. | 74–77 Transfer to ladle. | |
| | 77–79 Analysis of sample. | |
| 85–88 Charging of material | 79–89 Desulfurization. | 86–88 Analysis of sample. |
| 88–91 Moving of electrode. | 89–91 Analysis of sample. | 88–91 Moving of electrode. |
| 91–117 Fusion of pig-type iron. | 91–96 Cleaning. | 91–95 Transfer to steel ladle. |
| | 96–117 Idle. | 95–112 Idle. |
| | | 112–117 Charging of material |
| Subsequent cycles: Return to t = 58 minutes, for start of a new cycle identical to the first cycle. | | |

As shown in the above table, each operating cycle according to this method lasts 59 min. This is the time between two tapping operations in which steel is transferred from the second vessel in the furnace. It is also seen that during the operating cycle, the electrical power source 7 is used for a period of 46 min, which is 78% of the total duration of the cycle.

For comparison, the production cycle in a classical electric furnace with a single vessel (with the same power and capacity as in the preceding example, along with a desulfurization facility) would take 79 min, with electrical facility being utilized for 47 min, which is only 59% of the total duration of the cycle. Use of a double-vessel furnace with a single electric power source thus enables increased productivity on the order of 25%, which in turn enables rapid payback of the capital investment. Moreover, since each vessel 1, 10 according to the invention is specialized in the treatment of not yet desulfurized or desulfurized pig-type iron, respectively, there is no risk of re-pollution of the iron with sulfur following desulfurization of the iron. Such re-pollution inevitably occurs with the use of a furnace with a single vessel when the iron is returned to the furnace vessel after being desulfurized.

Supplementarily to or in place of the desulfurization step carried out on the pig-type iron (or, more generally, carried out on the "carburized metal" if it does not contain at least c. 3% carbon which would characterize it as "pig-type iron"), other pre-refining operations may be carried out, such as desilicization or dephosphorization. The production method proposed infra would be modified accordingly.

Obviously, variants of the installation described above may be imagined which do not depart from the concept and scope of the invention. In particular, not only the roof electrode but also the roof which the electrode traverses may be common for the two vessels 1, 10 in the furnace. Another variant would be to provide, as is already known in double-vessel steelmaking furnaces, a device which takes the hot gas escaping from the vessel to which the voltage is being applied and injects it back into the vessel to which no voltage is being applied, so as to preheat materials which have been charged to the latter vessel. Finally, as mentioned above, it is possible to employ two complete classical electric furnaces, instead of one furnace having two vessels and a single electric power source. The disadvantage of this is that the construction of the facility would be more onerous and costly, without a significant gain in productivity.

We claim:

1. A method of producing molten steel, comprising the steps of fusing carbon-rich ferrous materials into carburized molten metal in a first vessel of an electric furnace; pretreating the carburized molten metal in a pre-treatment facility to remove contaminants, and then decarburizing the pretreated molten metal in a second vessel of said electric furnace to avoid recontamination of the pretreated metal, wherein each of said pre-treatment facility and said first and second vessels are separate structures.

2. A method according to claim 1, wherein said pretreatment step of the molten metal comprises desulfurization of said metal.

3. The method according to claim 1, further comprising the step of adding ferrous materials to said second vessel having a sulfur content lower than that of said pretreated metal.

4. A method according to claim 3, wherein said ferrous materials having said lower sulfur content comprise iron from reduced iron ore that has been separated from carbonaceous materials.

5. A method according to claim 4, wherein said iron is separated from said carbonaceous materials by magnetic separation.

6. A method according to claim 1, wherein said first and second vessels are vessels of a single electric furnace having a single electric power means.

7. An apparatus for producing molten steel comprising a first vessel of an electric steelmaking furnace for fusing ferrous materials rich in carbonaceous materials into carburized molten metal, a facility for pretreating carburized molten metal produced by said first vessel to remove contaminants, a second vessel of an electric steelmaking furnace for decarburizing molten metal from said pretreatment facility, and means for introducing into said first vessel ferrous materials rich in carbon wherewith fusion of said ferrous materials in said first vessel results in said carburized molten metal, wherein each of said pretreating facility and said first and second vessels are separate, non-communicating structures.

8. An apparatus according to claim 7, further comprising means for introducing into said second vessel ferrous materials having a lower sulfur content than a sulfur content of molten metal produced by said first vessel.

9. An apparatus according to claim 8, further comprising means for separating ferrous materials from carbonaceous materials, means for treating ferrous materials rich in carbon and sulfur to remove at least some of said sulfur, and means for conveying the ferrous materials having reduced sulfur resulting from said treatment to said means introducing said materials into said second vessel.

10. An apparatus according to claim 9, wherein said means for separation is a magnetic separating means.

11. An apparatus according to claim 7, wherein said vessels comprise two separate vessels of a single electric furnace having a single electric power means.

* * * * *